United States Patent
Russo

(10) Patent No.: US 9,322,185 B1
(45) Date of Patent: Apr. 26, 2016

(54) TILE LIPPAGE REMOVAL SYSTEM

(71) Applicant: William P. Russo, Hartford, WI (US)

(72) Inventor: William P. Russo, Hartford, WI (US)

( * ) Notice: Subject to any disclaimer, the term of this patent is extended or adjusted under 35 U.S.C. 154(b) by 0 days.

(21) Appl. No.: 14/718,131

(22) Filed: May 21, 2015

(51) Int. Cl.
*E04F 21/20* (2006.01)
*E04F 21/00* (2006.01)
*F16B 43/00* (2006.01)

(52) U.S. Cl.
CPC .............. *E04F 21/0092* (2013.01); *E04F 21/20* (2013.01); *F16B 43/002* (2013.01)

(58) Field of Classification Search
CPC . E04F 21/0092; E04F 21/22; E04F 15/02005; E04F 21/00; E04F 21/1877; E04F 15/02022; E04G 21/00; Y10S 33/20; Y10S 52/01; G01B 5/285; F16B 37/00; F16B 37/16; F16B 11/006; F16B 43/002
USPC ........... 52/747.11, 749.11, 126.7, 389, 126.1, 52/127.7, 126.6, 127.3, DIG. 1; 33/533, 33/526, 527; 411/82, 435, 427, 534; D8/354; 248/188.4, 354.3; 249/192
See application file for complete search history.

(56) References Cited

U.S. PATENT DOCUMENTS

| | | | | |
|---|---|---|---|---|
| 2,128,844 A * | 8/1938 | Myer | ...................... | B27F 7/025 29/238 |
| 3,552,257 A * | 1/1971 | Tanabe | ..................... | F16B 37/16 411/368 |
| 3,961,453 A * | 6/1976 | Couwenbergs | ....... | E04D 11/005 52/126.1 |
| 4,024,683 A * | 5/1977 | Kilian | ................. | E04F 21/0092 52/127.3 |
| 4,397,125 A * | 8/1983 | Gussler, Jr. | ............. | E04F 21/22 52/127.3 |
| 7,257,926 B1 * | 8/2007 | Kirby | ................ | E04F 15/02005 33/526 |
| 7,621,100 B2 * | 11/2009 | Kufner | ................ | E04F 13/0892 33/526 |
| 7,861,487 B2 * | 1/2011 | Kufner | ............. | E04F 15/02005 33/526 |
| 8,079,199 B1 * | 12/2011 | Kufner | ................ | E04F 13/0892 33/526 |
| 8,181,420 B2 * | 5/2012 | Torrents I Comas | ................ | E04F 21/0092 52/127.7 |
| 8,336,279 B2 * | 12/2012 | Kufner | ............. | E04F 15/02005 33/526 |
| 8,635,815 B2 * | 1/2014 | Bordin | ................ | E04F 21/0092 33/526 |
| 8,689,522 B2 * | 4/2014 | Hoffman | ................. | E04F 21/00 52/747.11 |
| 8,950,079 B2 * | 2/2015 | Hillebrandt | ....... | E04F 15/02005 33/527 |
| 2014/0325936 A1 * | 11/2014 | PSaila | ................. | E04F 21/1877 52/749.11 |
| 2015/0211243 A1 * | 7/2015 | Irvine | ................. | E04F 21/0092 52/126.1 |

FOREIGN PATENT DOCUMENTS

AU WO 2014022889 A1 * 2/2014 .......... E04F 21/0092
IT EP 2549030 A2 * 1/2013 .......... E04F 21/0092

* cited by examiner

*Primary Examiner* — Robert Canfield
*Assistant Examiner* — Matthew Gitlin
(74) *Attorney, Agent, or Firm* — Donald J. Ersler

(57) ABSTRACT

A tile lippage removal system preferably includes a spacer post, a threaded cap and an anti-friction protection plate. The spacer post includes a base member, a spacer member and a threaded shaft. A bottom of the spacer member extends from a top of the base member. A break away connection is made between the spacer member and the base member. A bottom of the threaded shaft extends from a top of the spacer member. A plurality of grip extensions extend from an outer surface of a substantial inverted cup to allow rotation of the threaded cap. A female thread is formed in a center of the substantial inverted cup to threadably receive the threaded shaft. The anti-friction protection plate includes a round outer perimeter and a spacer opening, which is sized to receive the spacer member. The anti-friction protection plate may be used to improve existing tile lippage removal systems.

18 Claims, 6 Drawing Sheets

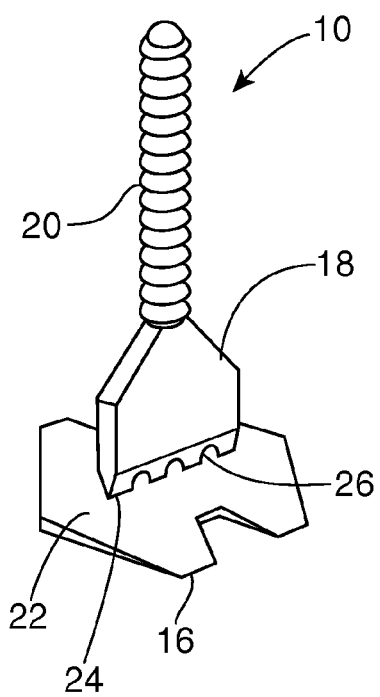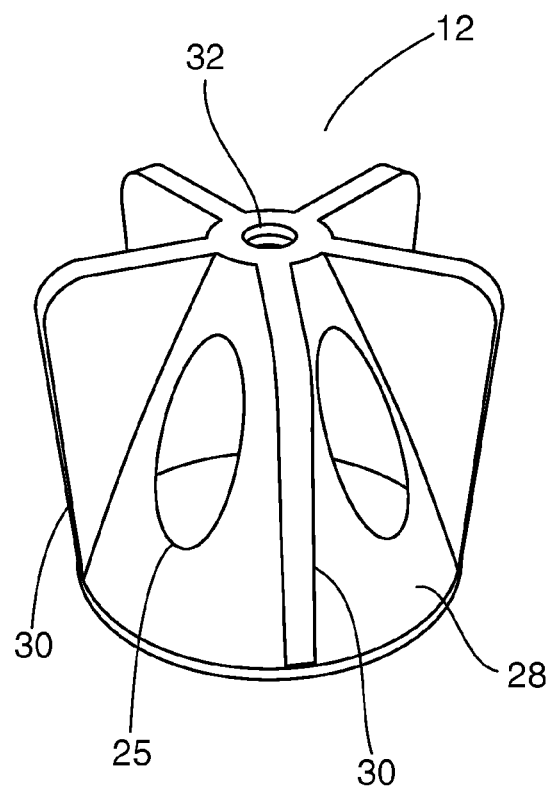
FIG. 2         FIG. 3

TILE LIPPAGE REMOVAL SYSTEM

BACKGROUND OF THE INVENTION

1. Field of the Invention

The present invention relates generally to tiles and more specifically to a tile lippage removal system, which provides only a downward force for laying tiles.

2. Discussion of the Prior Art

U.S. Pat. No. 7,992,354 to Doda Jr. discloses a device for leveling and aligning tiles and method for leveling and aligning tiles. U.S. Pat. No. 8,635,815 to Brodin discloses a leveling spacer for laying wall tiles, paving tiles and the like with the interposition of gaps. However, both of the above tile aligning devices and others similar to them, do not only apply downward force, but also apply a component of lateral force. The lateral force has the tendency to spread the tiles away from each other, such that the tile edges are no longer parallel to each other. Non-parallel edges between tiles are not acceptable. Additionally, a device that moves relative to a tile surface to apply downward pressure will also mar the tile surface. Finally, any lateral movement of the tiles relative to each other will cause tile glue to ooze out.

Accordingly, there is a clearly felt need in the art for a tile lippage removal system, which provides only a downward force for laying tiles; does not mar a top of the tiles; and prevents oozing of tile glue.

SUMMARY OF THE INVENTION

The present invention provides a tile lippage removal system, which does not mar a top of the tiles. The tile lippage removal system preferably includes a spacer post, a threaded cap and an anti-friction protection plate. The spacer post includes a base member, a spacer member and a threaded shaft. A bottom of the spacer member extends from a top of the base member. A break away connection is formed between the spacer member and the base member. A bottom of the threaded shaft extends from a top of the spacer member. The threaded cap preferably includes a substantial inverted cup and a plurality of grip extensions. The plurality of grip extensions extend from an outer surface of the substantial inverted cup to allow rotation of the threaded cap. A female thread is formed in a center of the substantial inverted cup to threadably receive the threaded shaft. The anti-friction protection plate preferably includes a round outer perimeter and a spacer opening that is sized to receive an outer perimeter of the spacer post and the threaded shaft. The anti-friction protection plate may be added to existing tile lippage removal systems with round threaded caps. The anti-friction protection plate would have an outer diameter, which is greater than that of the threaded cap and a spacer opening. The anti-friction protection plates for wedge type tile lippage removal systems would have a rectangular perimeter shape and a spacer opening that is sized to receive an outer perimeter of the spacer post. The anti-friction protection plate does not move laterally relative to the two adjacent tiles. The anti-friction protection plate is preferably fabricated from a clear or translucent material.

Accordingly, it is an object of the present invention to provide a tile lippage removal system, which provides only a downward force for laying tiles.

It is a further object of the present invention to provide a tile lippage removal system, which does not mar a top of the tiles.

Finally, it is another object of the present invention to provide a tile lippage removal system, which prevents oozing of tile glue.

These and additional objects, advantages, features and benefits of the present invention will become apparent from the following specification.

BRIEF DESCRIPTION OF THE DRAWINGS

FIG. 2 is a perspective view of a spacer post of a tile lippage removal system in accordance with the present invention.

FIG. 3 is a perspective view of a threaded cap of a tile lippage removal system in accordance with the present invention.

DETAILED DESCRIPTION OF THE PREFERRED EMBODIMENTS

Figure 1:
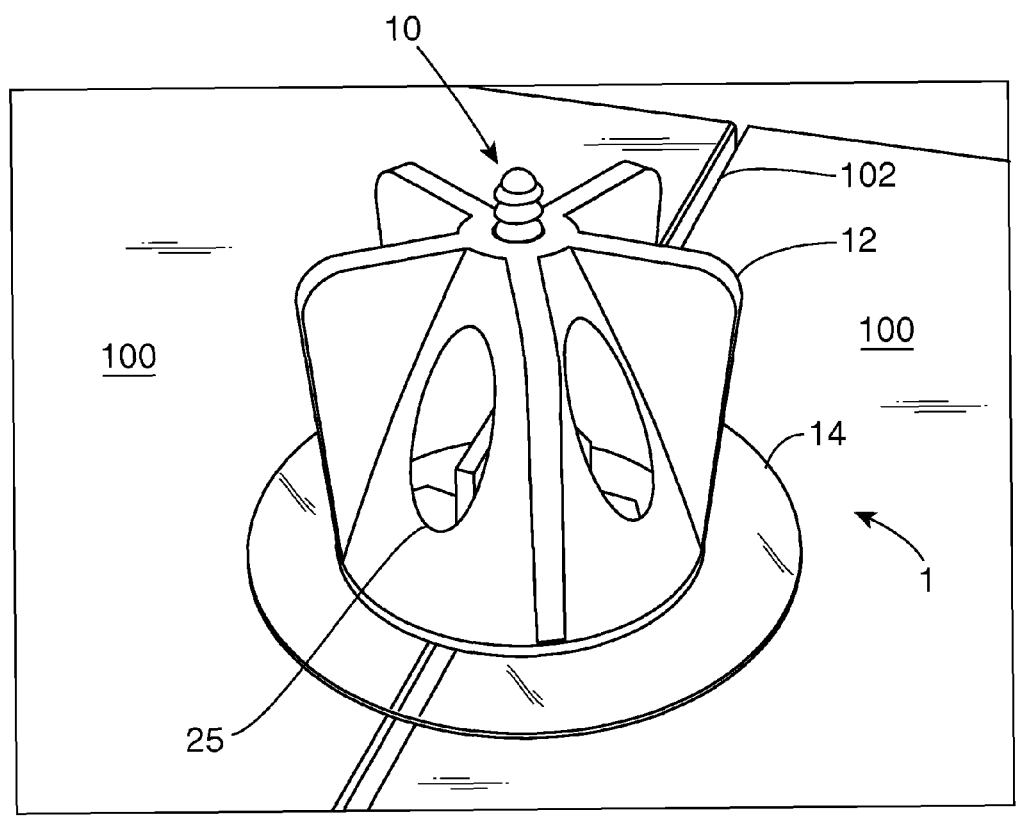
FIG. 1 is a perspective view of a tile lippage removal system retaining two adjacent tiles in accordance with the present invention.
Figure 4:
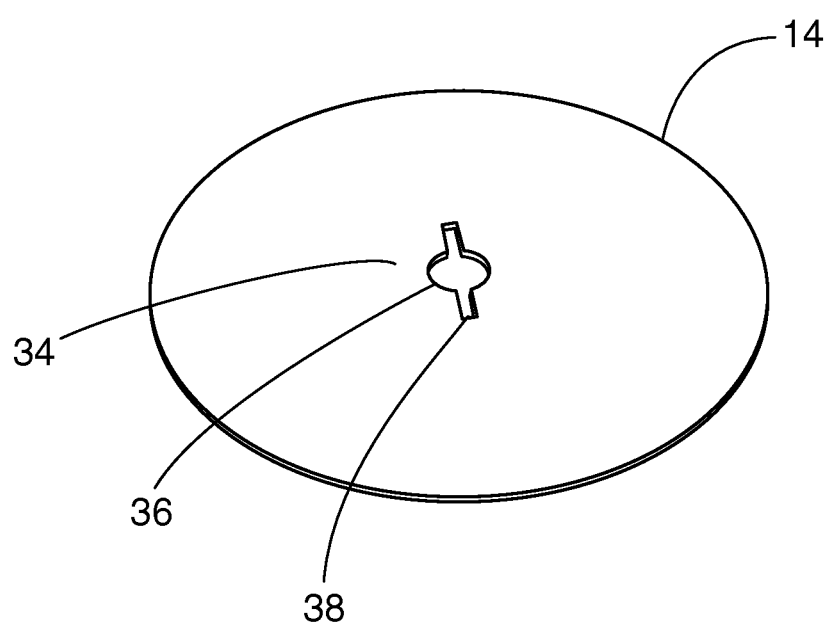
FIG. 4 is a perspective view of an anti-friction protection plate of a tile lippage removal system in accordance with the present invention.

With reference now to the drawings, and particularly to FIG. 1, there is shown a perspective view of a tile lippage removal system 1. With reference to FIGS. 2-4, the tile lippage removal system 1 preferably includes a spacer post 10, a threaded cap 12 and an anti-friction protection plate 14. The spacer post 10 includes a base member 16, a spacer member 18 and a threaded shaft 20. The base member 16 may have any suitable shape. A bottom of the spacer member 18 extends from a top of the base member 16. A break away connection 22 is made between the spacer member 18 and the base member 16. The break away connection 22 preferably includes a spacer member 18 with a reduced web 24 and a plurality of openings 26. The break away connection 22 allows the spacer member 18 to be separated from the base member 16 by kicking the spacer member 18 with a shoe. The spacer member 18 has a thickness, which is less than a gap 102 between two adjacent tiles 100. A bottom of the threaded shaft 20 extends from a top of the spacer member 16. The threaded cap 12 preferably includes a substantial inverted cup 28 and a plurality of grip extensions 30. The plurality of grip extensions 30 extend from an outer surface of the substantial inverted cup 28 to allow rotation of the threaded cap 12. A female thread 32 is formed in a center of the substantial inverted cup 28 to threadably receive the threaded shaft 20. A plurality of sight holes 25 are formed through the substantial inverted cup 28. The anti-friction protection plate 14 includes a round outer perimeter and a spacer opening 34. The spacer opening 34 includes a threaded shaft opening 36 and a spacer member opening 38.

Figure 5:
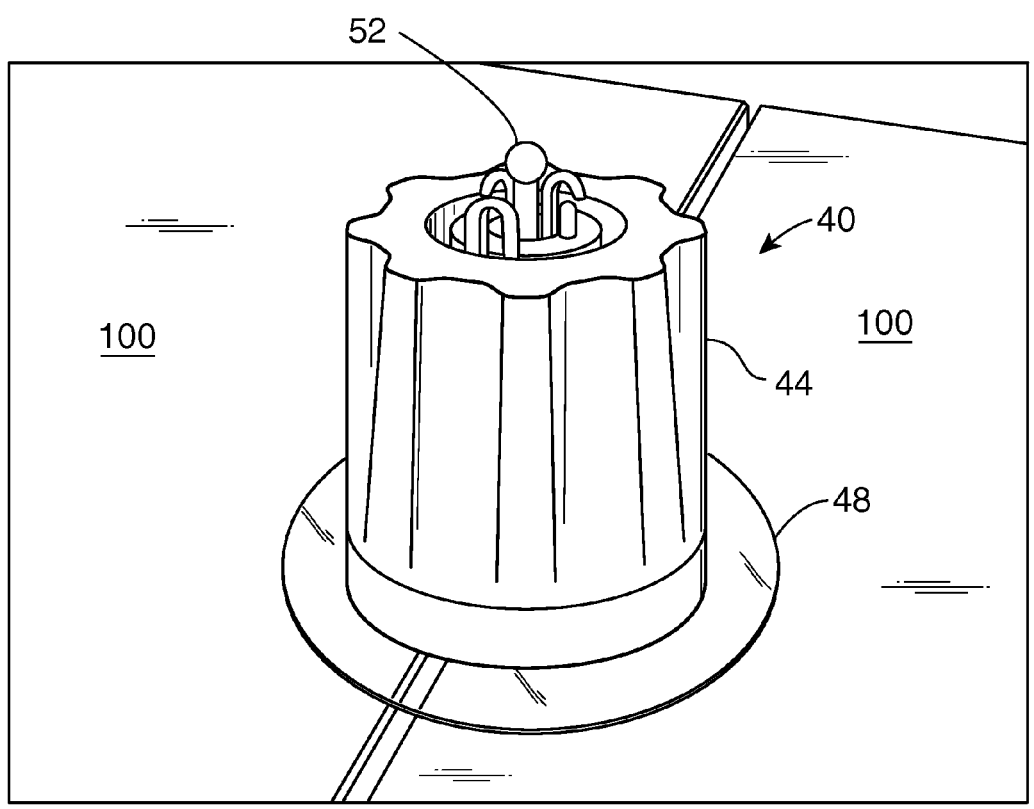
FIG. 5 is a perspective view of an existing tile lippage removal system with a round threaded cap and an anti-friction protection plate.
Figure 6:
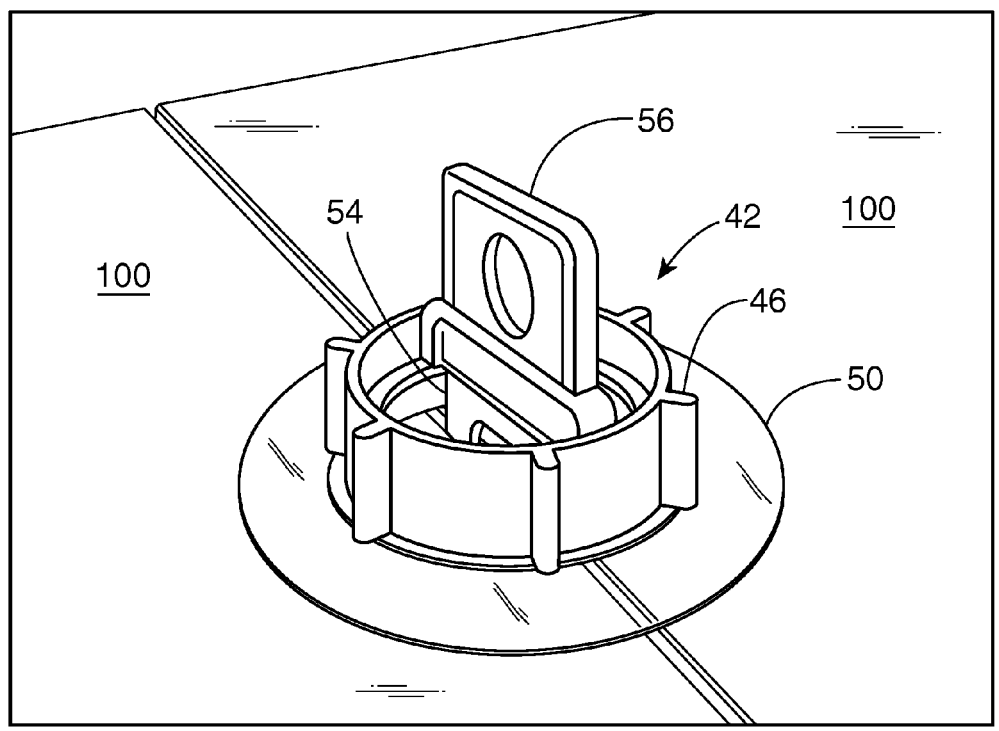
FIG. 6 is a perspective view of a second existing tile lippage removal system with a round threaded cap and an anti-friction protection plate.
Figure 7:
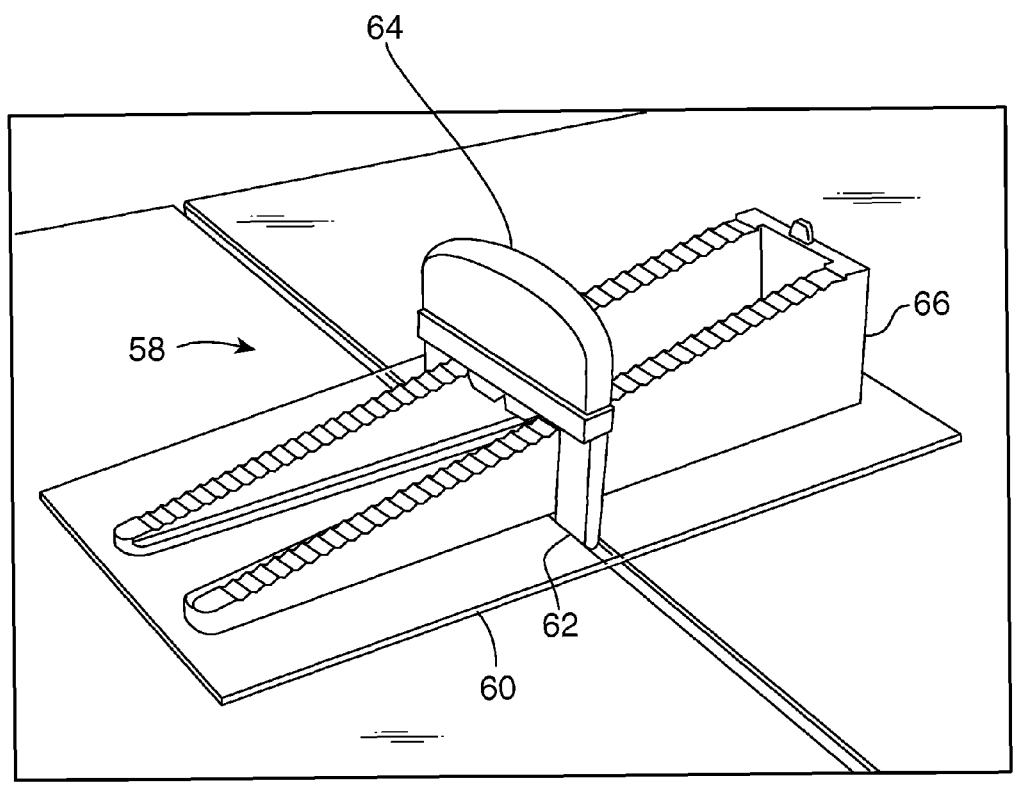
FIG. 7 is a perspective view of a wedge type existing tile lippage removal system with an anti-friction protection plate.

With reference to FIGS. 5-6, an anti-friction protection plate may be added to existing tile lippage removal systems 40, 42 with round threaded caps 44, 46, respectively. With reference to FIG. 5, an anti-friction protection plate 48 for the round threaded cap 44 would have an outer diameter, which is greater than that of the threaded cap 44. A spacer opening and a threaded shaft opening are formed through the anti-friction protection plate 48 to provide clearance for a spacer member 52. With reference to FIG. 6, an anti-friction protection plate 50 for the round threaded cap 44 would have an outer diameter, which is greater than that of the threaded cap 46. A spacer opening 54 is formed through the anti-friction protection plate 50 to provide clearance for a spacer member 56. With reference to FIG. 7, an anti-friction protection plate 60 for a wedge type tile lippage removal system 58 includes a rectangular perimeter shape and a spacer opening 62 that is sized to receive an outer perimeter of a spacer member 64. A wedge block 66 is retained in the spacer member 64. The round threaded caps 44, 46 and the wedge 66 are hold down devices. The anti-friction protection plates 14, 48, 50, 60 does not move laterally relative to the two adjacent tiles 100. The anti-friction protection plate 14, 48, 50 and 60 is preferably fabricated from a clear or translucent material. The combination of the translucent or clear anti-friction protection plate 14 and the plurality of sight holes 25 allow a distance between the two adjacent tiles 100 to be viewed through the threaded cap 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A tile lippage removal system comprising:
a spacer post includes a base member, a spacer member and a threaded shaft, a bottom of said spacer member extends from a top of said base member, a bottom of said threaded shaft extends from a top of said spacer member,
a threaded cap includes a female thread formed through a center of thereof, said female thread is sized to threadably receive said threaded shaft; and
an anti-friction protection plate includes a threaded shaft opening and two opposed slots, a first one of said two opposed slots extends from one side of said threaded shaft opening, a second one of said two opposed slots extends from an opposing side of said threaded shaft opening, said threaded shaft opening and said two opposed slots are sized to receive an outer perimeter of said spacer post and said threaded shaft, wherein said anti-friction protection plate is adapted to prohibit lateral movement relative to two adjacent tiles when said anti-friction protection plate rests thereupon.

2. The tile lippage removal system of claim 1 wherein:
a break away connection is formed between said spacer member and said base member, said break away connection includes a spacer member with a reduced web and a plurality of openings formed in said spacer member.

3. The tile lippage removal system of claim 1 wherein:
said threaded cap further includes a substantial inverted cup and a plurality of grip extensions, said plurality of grip extension extend outward from an outer surface of said substantial inverted cup.

4. The tile lippage removal system of claim 3 wherein:
a plurality of sight holes are formed through said substantial inverted cup.

5. The tile lippage removal system of claim 1 wherein:
said anti-friction protection plate includes a round outer perimeter.

6. The tile lippage removal system of claim 1 wherein:
said anti-friction plate is fabricated from one of a clear and translucent material.

7. A tile lippage removal system comprising:
a spacer post includes a base member, a spacer member and a threaded shaft, a bottom of said spacer member extends from a top of said base member, a break away connection is formed between said spacer member and said base member, a bottom of said threaded shaft extends from a top of said spacer member;
a threaded cap includes a female thread formed through a center of thereof, said female thread is sized to threadably receive said threaded shaft; and
an anti-friction protection plate includes a spacer opening that is sized to receive an outer perimeter of said spacer post and said threaded shaft, said threaded cap includes an outer perimeter length that is less than an outer perimeter length of said anti-friction protection plate, wherein said anti-friction protection plate is retained between a bottom of said threaded cap and two adjacent tiles, wherein said anti-friction protection plate is adapted to prohibit lateral movement relative to two adjacent tiles when said anti-friction protection plate rests thereupon.

8. The tile lippage removal system of claim 7 wherein:
said break away connection includes a spacer member with a reduced web and a plurality of openings formed in said spacer member.

9. The tile lippage removal system of claim 7 wherein:
said threaded cap includes a substantial inverted cup and a plurality of grip extensions, said plurality of grip extension extend outward from an outer surface of said substantial inverted cup.

10. The tile lippage removal system of claim 9 wherein:
a plurality of sight holes are formed through said substantial inverted cup.

11. The tile lippage removal system of claim 7 wherein:
said anti-friction protection plate includes a round outer perimeter.

12. The tile lippage removal system of claim 7 wherein:
said anti-friction plate is fabricated from one of a clear and translucent material.

13. A tile lippage removal system comprising:
a spacer post includes a base member, a spacer member and a threaded shaft, a bottom of said spacer member extends from a top of said base member, a bottom of said threaded shaft extends from a top of said spacer member,
a threaded cap includes a female thread formed through a center of thereof, said female thread is sized to threadably receive said threaded shaft; and
an anti-friction protection plate includes a threaded shaft opening and two opposed slots, a first one of said two opposed slots extends from one side of said threaded shaft opening, a second one of said two opposed slots extends from an opposing side of said threaded shaft opening, said threaded shaft opening and said two opposed slots are sized to receive an outer perimeter of said spacer post and said threaded shaft, said threaded cap includes an outer perimeter length that is less than an outer perimeter length of said anti-friction protection plate, wherein said anti-friction protection plate relative to two adjacent tiles is adapted to prohibit lateral movement when said anti-friction protection plate rests thereupon.

14. The tile lippage removal system of claim 13 wherein:
a break away connection is formed between said spacer member and said base member, said break away connection includes a spacer member with a reduced web and a plurality of openings formed in said spacer member.

15. The tile lippage removal system of claim 13 wherein:
said threaded cap further includes a substantial inverted cup and a plurality of grip extensions, said plurality of grip extension extend outward from an outer surface of said substantial inverted cup.

16. The tile lippage removal system of claim 15 wherein:
a plurality of sight holes are formed through said substantial inverted cup.

17. The tile lippage removal system of claim 13 wherein:
said anti-friction protection plate includes a round outer perimeter.

18. The tile lippage removal system of claim 13 wherein:
said anti-friction plate is fabricated from one of a clear and translucent material.

\* \* \* \* \*